(12) United States Patent
Gottwald

(10) Patent No.: US 7,983,567 B2
(45) Date of Patent: Jul. 19, 2011

(54) METHOD AND SYSTEM FOR POLARIZATION MODEM DISPERSION COMPENSATION

(75) Inventor: Erich Gottwald, Holzkirchen (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 683 days.

(21) Appl. No.: 11/997,890

(22) PCT Filed: Jun. 20, 2006

(86) PCT No.: PCT/EP2006/063348
§ 371 (c)(1),
(2), (4) Date: Feb. 4, 2008

(87) PCT Pub. No.: WO2007/014799
PCT Pub. Date: Feb. 8, 2007

(65) Prior Publication Data
US 2009/0142071 A1    Jun. 4, 2009

(30) Foreign Application Priority Data
Aug. 2, 2005   (DE) .................. 10 2005 036 297

(51) Int. Cl.
*H04B 10/00*   (2006.01)

(52) U.S. Cl. .......... 398/152; 398/65; 398/147; 398/158; 398/159; 385/11; 385/24; 385/27; 356/73.1

(58) Field of Classification Search .............. 398/152, 398/147, 158, 159, 65, 81, 79, 25, 26, 27, 398/148, 149, 33, 38, 208, 209, 162; 385/11, 385/2, 37, 27, 24; 356/73.1
See application file for complete search history.

(56) References Cited

U.S. PATENT DOCUMENTS

| | | | |
|---|---|---|---|
| 5,930,414 A * | 7/1999 | Fishman et al. | 385/11 |
| 6,671,464 B1 | 12/2003 | Kikuchi | |
| 2003/0219250 A1 * | 11/2003 | Wein et al. | 398/26 |
| 2003/0223759 A1 * | 12/2003 | Corbel et al. | 398/147 |
| 2004/0067057 A1 * | 4/2004 | Akiyama et al. | 398/26 |
| 2004/0120629 A1 | 6/2004 | Han et al. | |
| 2004/0151416 A1 | 8/2004 | Galtarossa et al. | |

FOREIGN PATENT DOCUMENTS

| | | |
|---|---|---|
| DE | 199 41 150 A1 | 3/2001 |
| DE | 101 64 497 A1 | 7/2003 |
| WO | WO-01/93465 A1 | 12/2001 |

* cited by examiner

*Primary Examiner* — Hanh Phan
(74) *Attorney, Agent, or Firm* — Laurence A. Greenberg; Werner H. Stemer; Ralph E. Locher

(57) ABSTRACT

The invention relates to a method and a system for controlling a PMD compensator (2). For this purpose, a measuring signal (MS) is branched off from an already compensated optical data signal (ODSK) and supplied to a polarization adjuster (2). The output signal of the latter is supplied to an optical filter unit (61) and subdivided into two optical measuring signal components (OMK1, OMK2) having different polarizations. After a respective opto-electrical conversion, the spectra are compared with each other in an analysis and control unit (81) and the PMD compensator (2) is adjusted in such a manner that they are as identical as possible.

26 Claims, 4 Drawing Sheets

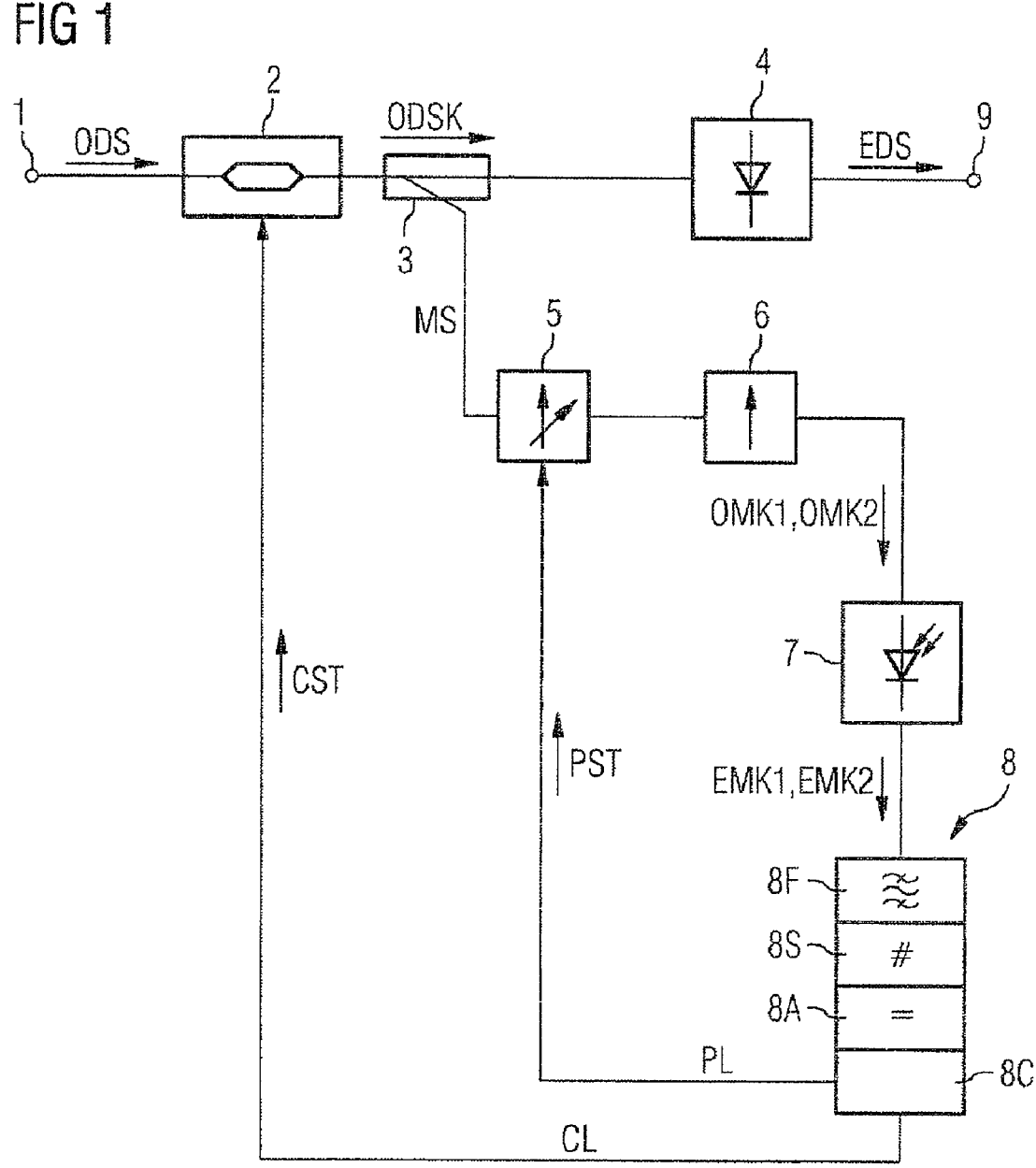

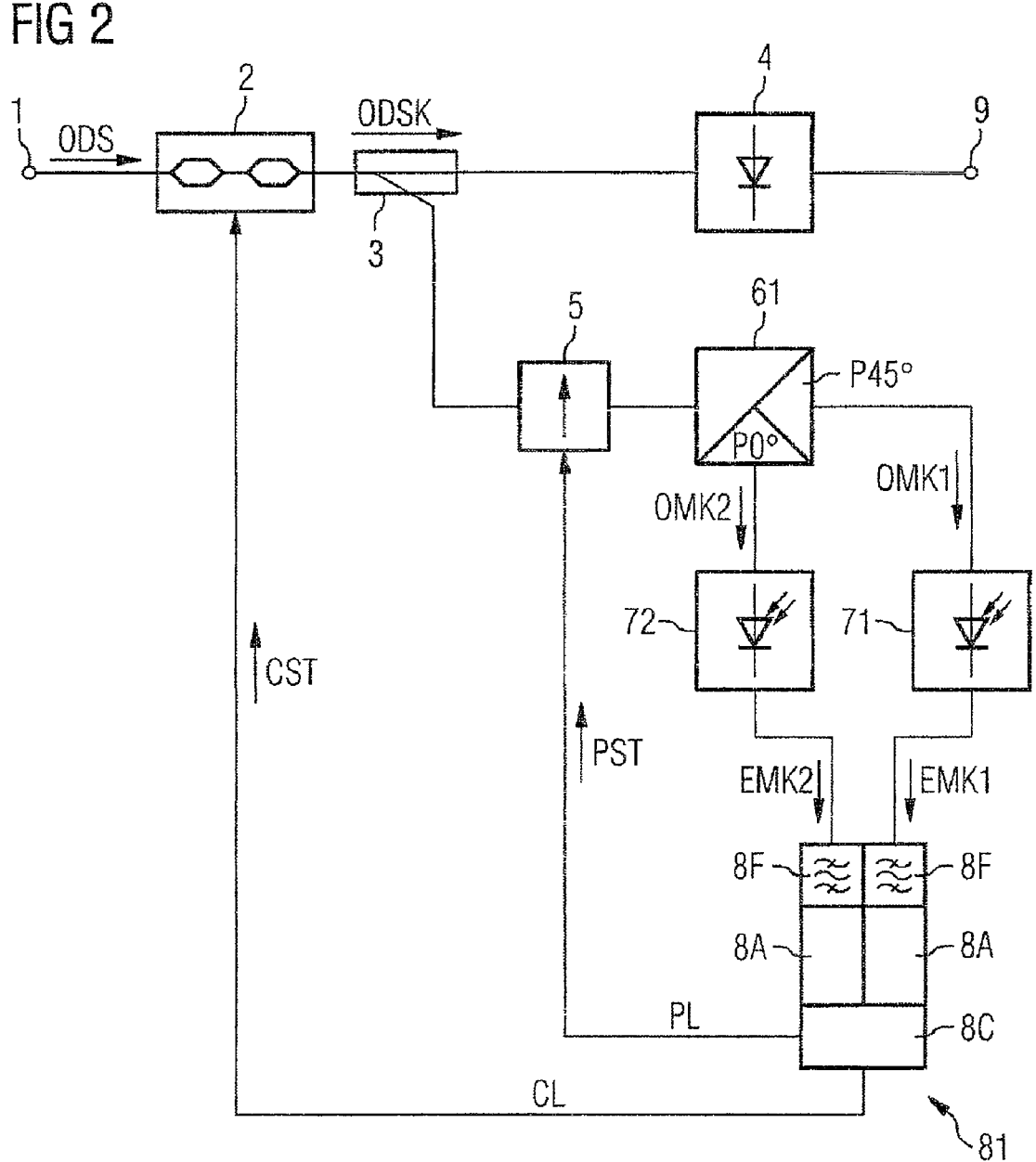

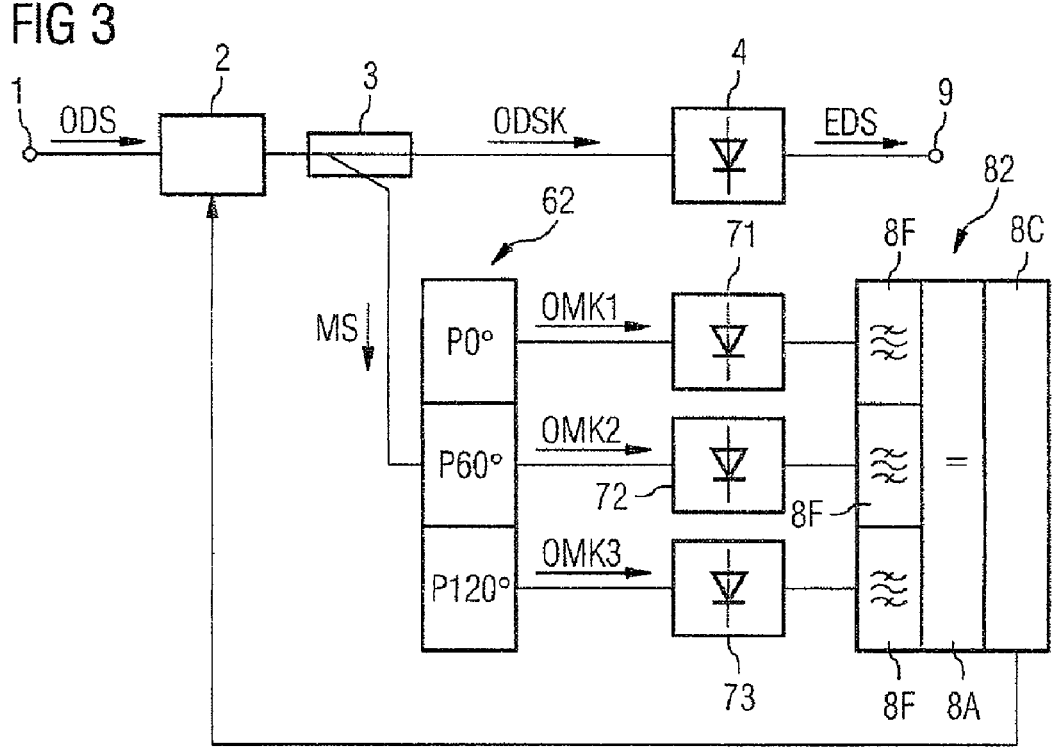
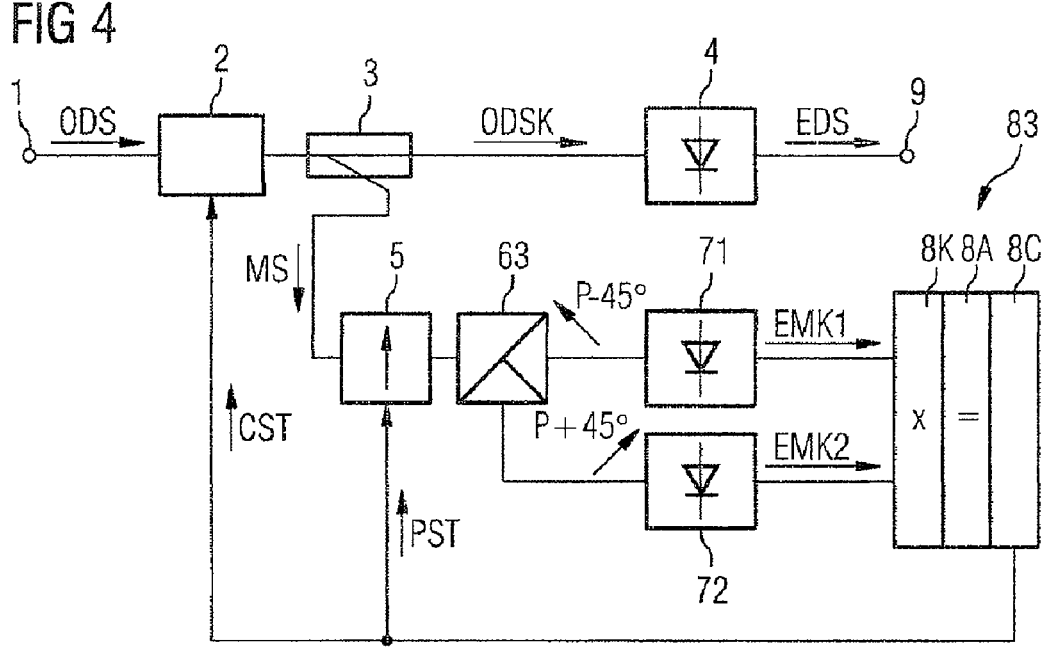

METHOD AND SYSTEM FOR POLARIZATION MODEM DISPERSION COMPENSATION

The invention relates to methods and systems for PMD compensation which are specified in the independent claims.

In older optical fibers transmission is considerably disturbed by polarization mode dispersion (PMD) at a data rate as low as 10 Gbit/s. Even in newly laid optical fibers, PMD leads to considerable disturbances at higher data rates. PMD can be compensated for, in principle. A number of concepts and various methods exist in respect of this. One problem associated with the compensation is identification of the PMD, since further disturbing effects are generally present. The patent DE 19 941 150 A1 discloses a regulating method which, after an opto-electrical conversion, analyses the spectrum with a plurality of filters and draws conclusions about the PMD of the system from the intensities of the selected wavelengths.

A further method, by which all types of disturbances can be compensated for, in principle, measures the error rate or the pseudo error rate as a quality criterion for the setting of the PMD compensator. However, said method is too slow if a plurality of parameters of the compensator have to be optimized.

It is an object of the invention to specify reliable methods for PMD compensation and systems suitable therefor.

This object is achieved by means of the features specified in the independent claims.

Advantageous developments are specified in the dependent claims.

In the case of perfect PMD compensation, the form of the measurement signal branched off from the compensated signal is independent of its polarization, that is to say independent of the setting of a polarization analyzer/polarization filter. This means that the electrical spectrum of the measurement signal, apart from the level, is also independent of the polarization. If the measurements are therefore carried out for two different settings of the polarization controller, which corresponds to the measurement of differently polarized signal components, they must produce the same spectrum if the PMD compensation is optimal. Differences dependent on the degree of incorrect compensation are produced in the case of a non-compensated measurement signal. The regulating method utilizes these measurements to minimize the differences for example in the trial and error method or in a spectrum-dependent manner.

In order to reduce the outlay, the measurements can be carried out temporally successively.

It is more advantageous, however, to carry out the measurements simultaneously for differently polarized measurement signal components. This shortens the measurement time and increases the accuracy since the same signal sequence is assessed.

In order to evaluate the differences of differently polarized measurement signal components, a correlation of the differently polarized measurement signal components can be carried out instead of measuring the spectra. In this case, the measurement signal components can also be orthogonal to one another. The two measurement methods can also be combined.

A polarization controller can be dispensed with if at least three differently polarized measurement signal components are simultaneously generated by a polarization filter device. The spectra of the optical measurement signal components converted into electrical measurement signal components are then compared or correlated with one another.

It is particularly advantageous to split the measurement signal into four differently polarized components which in each case have a different angle of 45° (90° on the Poincaré-sphere). This enables a virtually optimum comparison with respect to the spectra or a virtually optimum correlation of orthogonal signal components.

Exemplary embodiments of the invention are explained in more detail with reference to schematic circuit diagrams. In the figures:

FIG. 1 shows a PMD compensation device with polarization controller,

FIG. 2 shows an advantageous variant with simultaneous evaluation of two differently polarized measurement signal components, FIG. 3 shows a further variant without a polarization controller, FIG. 4 shows a corresponding variant with a correlation device.

Figure 5:
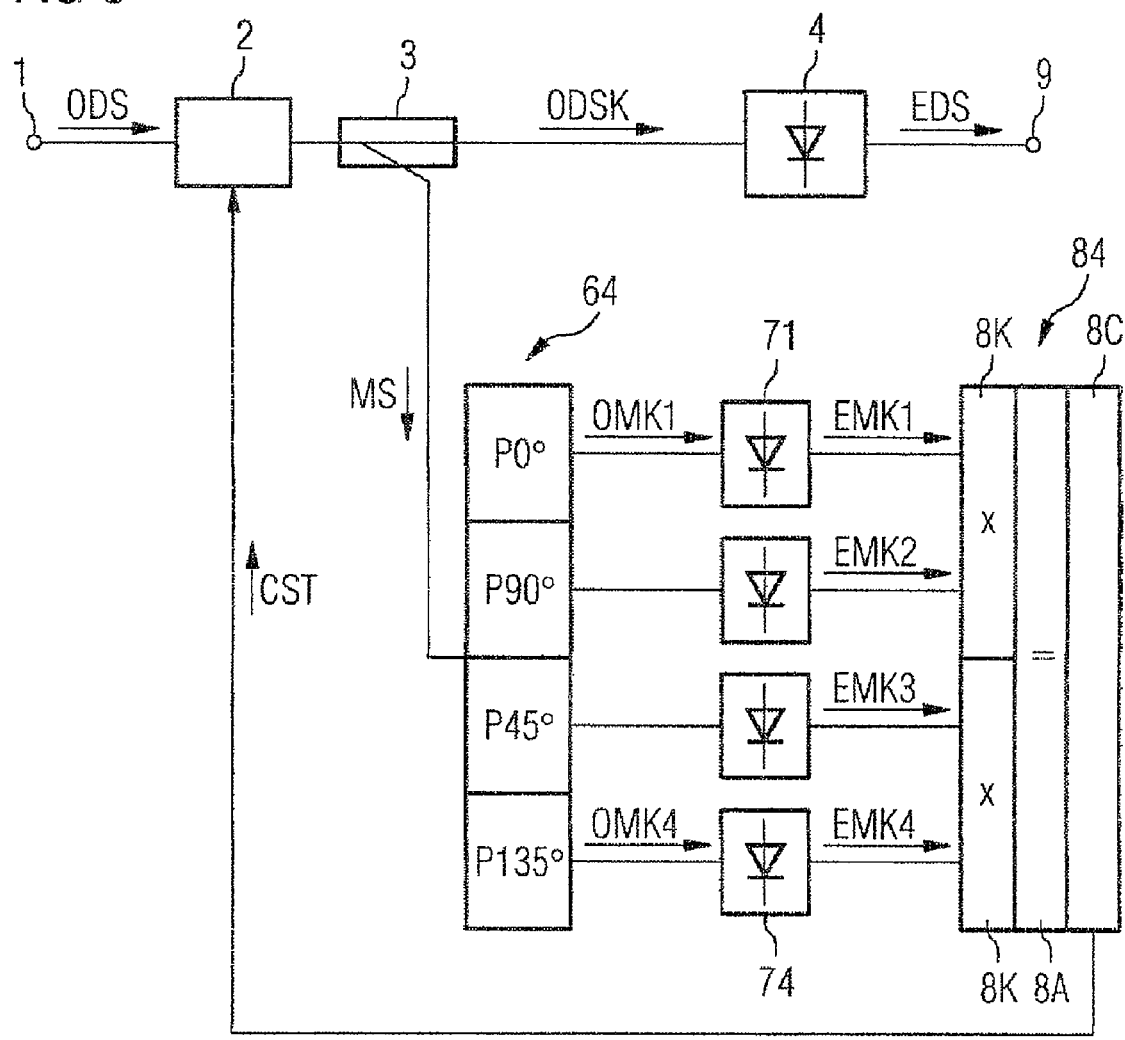
FIG. 5 shows a particularly advantageous variant which evaluates four differently polarized measurement signal components.

FIG. 1 shows a schematic circuit diagram of the correlation device. An optical signal ODS, generally a data signal, is fed to the signal input 1 of a PMD compensator 2 (polarization mode dispersion). Said signal passes via a splitter 3 to a receiving part 4, where it is demodulated and output as an electrical (data) signal EDS at the signal output 9. The task of the PMD compensator 2 is to optimally recombine the PMD-induced splitting of the transmitted signal into signal components, such that an as far as possible undistorted compensated optical signal ODSK is fed to the receiving part 4. The PMD compensator 2 must be regulated since the PMD is not a temporally constant quantity. Therefore, from the compensated signal ODSK at the output of the PMD compensator, a small portion is branched off as measurement signal MS and fed to a polarization controller 5. The latter supplies a measurement signal having a specific polarization as output signal. An optical measurement signal component OMK1 having a specific polarization is selected by a polarization filter 6 connected downstream and is fed to an analysis and control unit 8 via an opto-electrical transducer 7. Said analysis and control unit contains for example a filter bank 8F having different bandpass filters which evaluate the spectrum of the measurement signal component OMK1. The measurement of three different frequencies may suffice here. The spectral values obtained are buffer-stored in a memory 8S and evaluated in an analysis unit 8F. The polarization controller 5 is then altered by a polarizer control signal PST, which is output by a control part 8C via the control line CL, and an originally differently polarized measurement signal component OMK2 is selected at the output of the polarization filter 6. The spectra of the two measurement signal components OMK1 and OMK2 are compared with one another and the differences are minimized by control of the PMD compensator 2. In this case, the control part 8C of the analysis and control unit 8 can apply a trial and error method or effect a targeted setting of the PMD compensator, which setting is at least partly dependent on successive measurement results, by means of a compensator control signal CST via a compensator control line CL.

The invention is based on the following considerations: if no disturbing influences are present apart from (first-order) PMD, then the two eigenmodes (eigenstates) of the optical data signal are not affected by the (first-order) PMD. The two signal components and hence the measurement signal components and the spectra of the demodulated signals therefore exhibit the same appearance. However, the sum of the two components yields the PMD-distorted optical signal ODS on account of the PMD. If the resulting signal is therefore compared with an undistorted measurement signal component, i.e. one of the two eigenmodes, there are corresponding deviations in the form of the electrical signal and the spectra. The same holds true if differently polarized measurement signal components are compared with one another. It is only if there is a change in the polarization by 90° that it can happen that the orthogonal eigenmodes of the fiber are detected. The compensation would then be erroneous despite identical spectra. The polarization controller must therefore ensure that these states are avoided and only set polarization differences not equal to 90°. For the comparison of the spectra, the signals assigned to the individual frequencies are expediently normalized in the analysis and control unit. One disadvantage of the method is that successive signal sequences are assessed, which can lead to incorrect results in the case of short measurement intervals. It is only if the measurement intervals are sufficiently long that a reliable result is supplied.

FIG. 2 shows an advantageous embodiment in which two polarized signal components are measured simultaneously. For this purpose, a polarization filter unit 62 is connected downstream of the polarization controller 5 and supplies two differently polarized measurement signal components OMK1 and OMK2, e.g. having a linear polarization P0° and P45°. In this case, the polarization controller 5 is set in such a way that the signal components do not coincide with the eigenstates, or its setting is altered continuously during a measurement period (preferably by a multiple of 180°), such that this critical state occurs only briefly. This can be avoided, moreover, if the difference between the polarization angles is not equal to 90° (180° on the Poincarésphere). The spectra of the two measurement signal components OMK1 and OMK2 are evaluated by separate filter banks 8F and, after they have been normalized, are compared with one another. The PMD compensator 2 is set in such a way that the two normalized spectra are as far as possible identical.

FIG. 3 illustrates a further arrangement, which dispenses with a polarization controller. A polarization filter unit 62 outputs three optical measurement signal components OMK1, OMK2 and OMK3 which are differently polarized by 60° in each case (e.g. having the polarizations P0°, P60°, P120°). After the opto-electrical conversion, they are fed to three filter banks 8F, which determine the signal spectra of the electrical measurement signal components. After a standardization and analysis of the spectra, the difference between the spectra is minimized by setting the PMD compensator. It suffices for in each case only the two spectra which have the largest differences to be compared with one another. This is ascertained first before the compensation is optimized.

FIG. 4 shows a further variant of the PMD compensation device, which largely corresponds to FIG. 2. The measurement signal is split into two differently polarized measurement signal components in a polarization filter unit 63. Instead of using a plurality of filter banks for assessing the spectrum, however, the electrical measurement signal components EMK1 and EMK2 are temporally correlated with one another. The difference in the polarization of the optical measurement signal components can there also amount to 90°, e.g. P-45° and P+45° with respect to the measurement signal at the output of the polarization controller. If the electrical measurement signal components EMK1 and EMK2 corresponding to eigenstates are correlated with one another, then this leads to an optimum sensitivity with respect to first-order PMD. In this embodiment, as also in the further versions with a polarization controller 5, firstly the setting thereof is optimized and then this state is maintained by regulation. The PMD compensator is subsequently set on the basis of the differences determined in the correlators 8K, the sums or the sums of the squares of said differences being minimized. The setting of the polarization controller can, of course, also be varied again, as in all the versions with a polarization controller.

FIG. 5 again shows a suitable embodiment without a polarization controller, but now four measurement signal components OMK1-OMK4 which are polarized differently by 45° in each case and have polarizations P0°, P45°, P90°, P135° are selected by a polarization filter unit 64. After the conversion into electrical measurement signal components EMK1-EMK4, in each case two measurement signal components, e.g. EMK1, EMK2, are correlated with one another (or the two more favorable measurement signal components are used for the correlation). The results of the two correlations can be added; it is likewise possible to use the correlation result which is more favorable for the regulation. The sigma function or measurement signal components converted into binary signals may already suffice for an optimization. It should also be added that both methods, evaluation of the spectrum and correlation, can be used jointly.

At higher data rates the PMD can lead to propagation time differences between the eigenstates of a number of bits. This can be identified particularly simply in the correlation methods described, in which the correlation is carried out simultaneously or in temporal order between signal components delayed for different lengths of time, in order firstly to identify the propagation time differences between the eigenstates (first-order PMD) and to obtain an evaluatable reception signal through corresponding setting of the PMD compensator. After a provisional compensation of the first-order PMD, the fine setting for compensation of higher-order PMD is then effected. This can also be determined by other measuring methods.

The invention claimed is:

1. A method for polarization mode dispersion PMD compensation of an optical signal (ODS),
   which is corrected into a compensated optical signal (ODSK) by a PMD compensator (2) and in which a measurement signal (MS) branched off from the compensated optical signal (ODSK) is employed for determining the polarization mode dispersion PMD and for controlling the PMD compensator (2) and a polarization controller (5) controlling the polarization of the measurement signal (MS),
   characterized
      in that a first optical measurement signal component (OMK1) having a first polarity)(P0°) and a second optical measurement signal component (OMK2) having a second polarity(P45°), are separated from the measurement signal (MS),
      in that the first optical measurement signal component (OMSK1) and the second optical measurement signal component (OMSK2) are converted into a first electrical measurement signal component (EMSK1) and a second electrical measurement signal component (EMSK2),
      in that the electrical measurement signal components (EMK1, EMK2) are measured and evaluated simultaneously,
      in that in that the polarity of the compensated signal (ODSK) or of the measurement signal (MS) is regulated by the polarization controller (5),
      and in that the PMD compensator (2) is controlled in order to obtain as far as possible identical spectra of the electrical measurement signal components (EMK1, EMK2).

2. The method as claimed in claim 1, characterized in that the polarities of the first optical measurement signal component (OMK1) and the second optical measurement signal component (OMK2) are not orthogonal.

3. The method as claimed in claim 2, characterized in that the second polarity of the second component (OMK2) differs from the first polarity of the first optical measurement signal component (OMK1) by 45°.

4. The method as claimed in claim 1, characterized in that the setting of the polarization controller (5) is varied during a measurement period.

5. The method as claimed in claim 1, characterized in that the spectra of the electrical measurement signal components (EMK1, EMK2) are evaluated.

6. The method as claimed in claim 5, characterized in that the spectra are normalized prior to correlation.

7. The method as claimed in claim 1, characterized in that the electrical measurement signal components (EMK1, EMK2) are temporally correlated with one another, and in that the PMD compensator (2) is set in such a way that a maximum correlation is achieved and the spectra of the electrical measurement signal components (EMSK1, EMSK2) are as far as possible Identical.

8. The method as claimed in claim 7, characterized in that the electrical measurement signal components (EMK1, EMK2) are normalized prior to the correlation.

9. The method as claimed in claim 8, characterized in that the electrical measurement signal components (EMK1, EMK2) are converted into binary signals which are subsequently correlated with one another.

10. A method for the PMD compensation of an optical signal (ODS), which is corrected into a compensated optical signal (ODSK) by a PMD compensator (2) and in which a measurement signal (MS) branched off from the compensated optical signal (ODSK) is employed for determining the polarization mode dispersion PMD and for controlling the PMD compensator (2), characterized
in that at least three optical measurement signal components (OMK1, OMSK2, OMK3, . . . ) having at least three different equal spaced polarities (P0°, P60°,P120°) are separated from the measurement signal (MS),
in that the at least three optical measurement signal components (OMK1, OMSK2, OMK3, . . . ) are converted into at least three electrical measurement signal components (EMK1, EMK2, EMK3, . . . ),
in that the measurement signal components (EMK1, EMK2) are measured and evaluated simultaneously and then compared with one another, and
in that the PMD compensator (2) is controlled in order to obtain as far as possible identical spectra of the measurement signal components (EMK1, EMK2, EMK3, . . . ).

11. The method as claimed in claim 10, characterized in that 3 optical measurement signal components (OMK1, OMK2, OMK3) having different polarizations (P0°, P60°, P120°) with a phase difference of 60° are selected and converted into electrical measurement signal components (EMK1, EMK2, EMK3).

12. The method as claimed in claim 10, characterized in that 4 different measurement signal components (OMK1, OMK2, OMK3, OMK4) which are polarized differently by 45° in each case are selected and converted into electrical measurement signal components (EMK1, EMK2, EMK3, EMK4).

13. The method as claimed in claim 10, characterized in that the spectra of at least two electrical measurement signal components (EMK1, EMK2, . . . ) are compared with one another.

14. The method as claimed in claim 13, characterized in that the spectra of the electrical measurement signal components (EMK1, EMK2, . . . ) are normalized prior to the comparison.

15. The method as claimed in claim 10, characterized in that at least two electrical measurement signal components (EMSK1, EMSK2) are temporally correlated with one another, and in that the PMD compensator (2) is set in such a way that a maximum correlation is achieved and the spectra of the electrical measurement signal components (EMSK1, EMSK2) are as far as possible identical.

16. The method as claimed in claim 15, characterized in that the electrical measurement signal components (EMK1, EMK2, . . . ) are normalized prior to the correlation.

17. The method as claimed in claim 16, characterized in that the electrical measurement signal components (EMK1, EMK2) are converted into binary signals which are subsequently correlated with one another.

18. A system for polarization mode dispersion PMD compensation comprising a PMP compensator (2), to which an optical signal (ODS) is fed and which outputs a compensated optical signal (ODSK) and comprising a regulating device, which receives a measurement signal (MS) branched off from the compensated optical signal (ODSK) and has a series circuit formed by a polarization controller (5), a polarization filter device (61), which outputs differently polarized optical measurement components (OMK1, OMK2), opto-electrical transducers (71, 72), which are connected downstream of the polarization filter device (61, 63) and which output electrical measurement signal components (EMK1, EMK2) and feeds them to an analysis and control unit (81, 83), characterized
in that the polarization filter device (61, 63) outputs only two differently polarized optical measurement signal components (OMK1, OMK2),
in that the analysis and control unit (81, 83) is designed to evaluate the electrical measurement signal components (EMK1, EMK2) and to control the polarization controller (5) and the PMD compensator (2) in such a way that the spectra of the electrical measurement signal components (EMK1, EMK2) are as far as possible identical.

19. The system as claimed in claim 18, characterized in that the polarization filter device (61) is designed to output the two optical measurement signal components (OMK1, OMK2) having non orthogonal polarizations (P0°,P45°).

20. The system as claimed in claim 19, characterized in that the filter device (61) outputs the two optical measurement signal components (OMK1, OMK2) having a polarizations (P0° , P45°) difference of 45° .

21. The system as claimed in claim 18, characterized in that the analysis and control unit (83) is designed to vary the polarization during a measurement period.

22. The system as claimed in claim 18, characterized in that the analysis and control unit (81, 83) is designed to compare spectra of the electrical measurement signal components (EMK1, EMK2) or to correlate temporarily the electrical measurement signal components (EMK1, EMK2).

23. A system for polarization mode dispersion PMD compensation comprising a PMP compensator (2), to which an optical signal (ODS) is fed and which outputs a compensated optical signal (ODSK) and comprising a regulating device, which receives a measurement signal (MS) branched off from the compensated optical signal (ODSK), the regulating device has a series circuit formed by a polarization filter device (62, 64), to which the measurement signal (MS) is fed and which outputs at least three optical measurement components (OMK1, OMK2, OMK3, . . . ), opto-electrical transducers (71, 72, 73, . . . ), which are connected downstream of the polarization filter device (62, 64), opto-electrical transducers (71, 72), which are connected downstream of the polarization filter device (62, 64) and which output electrical measurement signal components (EMk1, EMK2, EMK3, . . . ) and feed them to an analysis and control unit (82, 84), characterized in that the polarization filter device (62, 64) outputs at least three optical measurement signal components (OMK1, OMK2, OMK3, . . . ) having equal polarization (P0°, P60°, P120° , . . . ) differences with adjacent optical measurement signal components, and in that the analysis and control unit (82, 84) is designed to evaluate at least two of the electrical measurement signal components (EMK1, EMK2, EMK3, . . . ) with one another and to control the PMD compensator (2) in such a way that the spectra of the electrical measurement signal components (EMK1, EMK2, EMK3, . . . ) are as far as possible identical.

24. The system as claimed in claim 23, characterized in that the polarization filter device (62, 64) outputs three optical measurement signal components (OMK1, OMK2, OMK3) having equal polarization (P0°, P60°, P120°) differences of 60 degrees or four optical measurement signal components (OMK1, OMK2, OMK3, OMK4) having equal polarization (P0°, P45°, P90°, P135°) differences of 45degrees.

25. The system as claimed in claim 23, characterized in that the analysis and control unit (82, 84) has at least two filter banks (8F) for simultaneously assessing spectra of at least two electrical measurement signal components (EMK1, EMK2, . . . ).

26. The system as claimed in claim 23, characterized in that the analysis and control unit (82, 84) is designed to carry out a temporary correlation of at least two electrical measurement signal components (EMK1, EMK2, . . . ).

\* \* \* \* \*